US011210828B2

(12) United States Patent
Park et al.

(10) Patent No.: US 11,210,828 B2
(45) Date of Patent: Dec. 28, 2021

(54) METHOD AND ELECTRONIC DEVICE FOR OUTPUTTING GUIDE

(71) Applicant: Samsung Electronics Co., Ltd., Gyeonggi-do (KR)

(72) Inventors: Mi Ji Park, Seoul (KR); Jae Han Lee, Gyeonggi-do (KR); Ho Young Lee, Seoul (KR)

(73) Assignee: Samsung Electronios Co., Ltd

( * ) Notice: Subject to any disclaimer, the term of this patent is extended or adjusted under 35 U.S.C. 154(b) by 194 days.

(21) Appl. No.: 16/345,489

(22) PCT Filed: Oct. 27, 2017

(86) PCT No.: PCT/KR2017/011946
§ 371 (c)(1),
(2) Date: Apr. 26, 2019

(87) PCT Pub. No.: WO2018/080210
PCT Pub. Date: May 3, 2018

(65) Prior Publication Data
US 2021/0042974 A1 Feb. 11, 2021

(30) Foreign Application Priority Data

Oct. 28, 2016 (KR) .................. 10-2016-0142398

(51) Int. Cl.
*G06T 11/60* (2006.01)
*G06T 7/90* (2017.01)
*G06T 3/00* (2006.01)

(52) U.S. Cl.
CPC ............ *G06T 11/60* (2013.01); *G06T 3/0031* (2013.01); *G06T 3/0093* (2013.01); *G06T 7/90* (2017.01); *G06T 2207/20132* (2013.01)

(58) Field of Classification Search
CPC .... G03B 13/02; G03B 17/18; H04N 5/23238; H04N 5/23293; H04N 5/232; G06T 11/60;
(Continued)

(56) References Cited

U.S. PATENT DOCUMENTS 7,424,218 B2   9/2008   Baudisch et al.
7,675,528 B2   3/2010   Walker et al.
(Continued)

FOREIGN PATENT DOCUMENTS

JP   2007180916   7/2007
JP   2015505447   2/2015
(Continued)

OTHER PUBLICATIONS

PCT/ISA/210 Search Report issued on PCT/KR2017/011946, pp. 5.
PCT/ISA/237 Written Opinion issued on PCT/KR2017/011946, pp. 4.

*Primary Examiner* — Ming Wu
(74) *Attorney, Agent, or Firm* — The Farrell Law Fim, P.C.

(57) ABSTRACT

An electronic device according to one embodiment of the disclosure includes a display, a memory that stores an application for editing an image, and a processor that outputs the image through the application onto the display. The processor may be configured to output, on the display, the image, a first guide indicating an area to be cropped in the image, and a preview corresponding to the first guide in a first mode of the application. The processor may output, on the display, an image changed in accordance with a second mode in response to a user input to change a mode from the first mode to the second mode. The processor may output a second guide corresponding to the second mode on the display such that the preview corresponding to the first guide (Continued)

is output. In addition, various embodiments understood through the specification are possible.

13 Claims, 13 Drawing Sheets

(58) Field of Classification Search
CPC ......... G06T 2207/20132; G06T 3/0031; G06T 3/0093; G06T 7/90
See application file for complete search history.

(56) References Cited

U.S. PATENT DOCUMENTS

| | | | |
|---|---|---|---|
| 7,961,200 | B2 | 6/2011 | Walker, Jr. et al. |
| 8,810,666 | B2 | 8/2014 | Grundmann et al. |
| 8,971,623 | B2 | 3/2015 | Gatt et al. |
| 9,041,727 | B2 | 5/2015 | Ubillos et al. |
| 9,413,967 | B2 | 8/2016 | Kim et al. |
| 9,478,006 | B2 | 10/2016 | Edwin et al. |
| 9,554,043 | B2 | 1/2017 | Grundmann et al. |
| 9,569,078 | B2 | 2/2017 | Cherna et al. |
| 2005/0104897 | A1 | 5/2005 | Walker et al. |
| 2005/0174460 | A1* | 8/2005 | Aizawa ............... H04N 5/23245 348/333.01 |
| 2007/0025723 | A1* | 2/2007 | Baudisch ............... H04N 5/262 396/287 |
| 2007/0071432 | A1* | 3/2007 | Senba ................... H04N 5/262 396/121 |
| 2010/0165369 | A1 | 7/2010 | Walker et al. |
| 2013/0182134 | A1 | 7/2013 | Grundmann et al. |
| 2013/0235071 | A1 | 9/2013 | Ubillos et al. |
| 2013/0235076 | A1 | 9/2013 | Cherna et al. |
| 2013/0236093 | A1 | 9/2013 | Gatt et al. |
| 2014/0098188 | A1* | 4/2014 | Kwak ...................... G06T 3/40 348/38 |
| 2014/0240544 | A1 | 8/2014 | Kim et al. |
| 2014/0327788 | A1 | 11/2014 | Grundmann et al. |
| 2015/0205502 | A1 | 7/2015 | Ubillos et al. |
| 2015/0278986 | A1 | 10/2015 | Edwin et al. |
| 2016/0328824 | A1 | 11/2016 | Kim et al. |
| 2017/0109023 | A1 | 4/2017 | Cherna et al. |

FOREIGN PATENT DOCUMENTS

| | | |
|---|---|---|
| KR | 1020140105313 | 9/2014 |
| KR | 1020150068299 | 6/2015 |

* cited by examiner

METHOD AND ELECTRONIC DEVICE FOR OUTPUTTING GUIDE

PRIORITY

This application is a National Phase Entry of PCT International Application No. PCT/KR2017/011946 which was filed on Oct. 27, 2017, and claims priority to Korean Patent Application No. 10-2016-0142398, which was filed on Oct. 28, 2016, the content of each of which is incorporated herein by reference.

TECHNICAL FIELD

Embodiments disclosed herein relate to a technique for providing a guide for editing an image.

BACKGROUND ART

Various types of electronic products are being developed and distributed owing to a development of electronic technology. In recent years, there has been growing interest in a camera that may capture not only fixed objects such as people and landscapes but also capture videos. Especially, a 360° camera which may capture surrounding environment from every angle is being actively developed.

The 360° camera may capture pictures, videos, or the like via a plurality of lenses. The surrounding environment may be captured from every angle using the 360° camera. Thus, the user may capture realistic pictures, videos, and the like via the 360° camera. The user may identify the pictures, videos, or the like, captured by the 360° camera through an electronic device such as a smart phone or a computer equipped with a display.

DISCLOSURE

Technical Problem

When an image captured via the above-mentioned 360° camera is output on a display, three-dimensional surrounding environment should be output in a two-dimensional image. Therefore, distortion may occur in the image output on the display. Therefore, it is necessary to correct the distortion occurred in the image and provide the corrected image to the user. An electronic device may correct the distortion occurred in the image using an algorithm for correcting a distortion.

However, when only the corrected image is output on the display or a guide of the same form is repeatedly output on the display regardless of an attribute of the image, it may be difficult for a user to recognize which portion is corrected. For example, when only the corrected image is output on the display, it may be difficult for the user to recognize a position of the corrected portion, a size of the corrected portion, a corrected angle, and the like among distorted portions. When the guide is provided, but the guide is repeatedly output on the display in the same form regardless of the attribute of the image, the user may recognize the position of the corrected portion. However, it may be difficult for the user to recognize a degree of correction, the corrected angle, and the like.

A purpose of embodiments disclosed herein is to provide an electronic device for solving above-mentioned problems and for achieving purposes set forth herein.

Technical Solution

An electronic device according to one embodiment of the disclosure includes a display, a memory that stores an application for editing an image, and a processor that outputs the image through the application onto the display. The processor may be configured to output, on the display, the image, a first guide indicating an area to be cropped in the image, and a preview corresponding to the first guide in a first mode of the application. Further, the processor may be configured to output an image changed in accordance with a second mode in response to a user input to change a mode of the application from the first mode to the second mode. Further, the processor may be configured to output a second guide corresponding to the second mode on the display such that the preview corresponding to the first guide is output.

An electronic device according to one embodiment of the disclosure includes a display, a memory that stores an application for editing an image, and a processor that outputs the image through the application onto the display. The processor may be configured to output, on the display, the image, a guide indicating an area to be cropped in the image, and a preview corresponding to the guide. The processor may be configured to change the guide or an area output on the display in the image in response to a user input for changing the preview.

A method for outputting a guide in an electronic device according to one embodiment of the disclosure may include outputting, on a display, an image, a first guide indicating an area to be cropped in the image, and a preview corresponding to the first guide in a first mode of an application, outputting, in response to a user input for changing the first mode to a second mode, an image changed in accordance with the second mode on the display, and outputting a second guide corresponding to the second mode on the display such that the preview corresponding to the first guide is output.

Advantageous Effects

According to embodiments disclosed herein, even though the image is changed in accordance with the mode change, the guide is changed and displayed on the image such that the same preview is provided. Thus, the user may easily recognize information about the corrected area.

Further, according to various embodiments disclosed herein, visibility of the guide may be increased by obtaining the dominant color of the image and setting the color of the guide to the complementary color.

In addition, various effects may be provided that are directly or indirectly understood through the present document.

MODE FOR INVENTION

Figure 1:
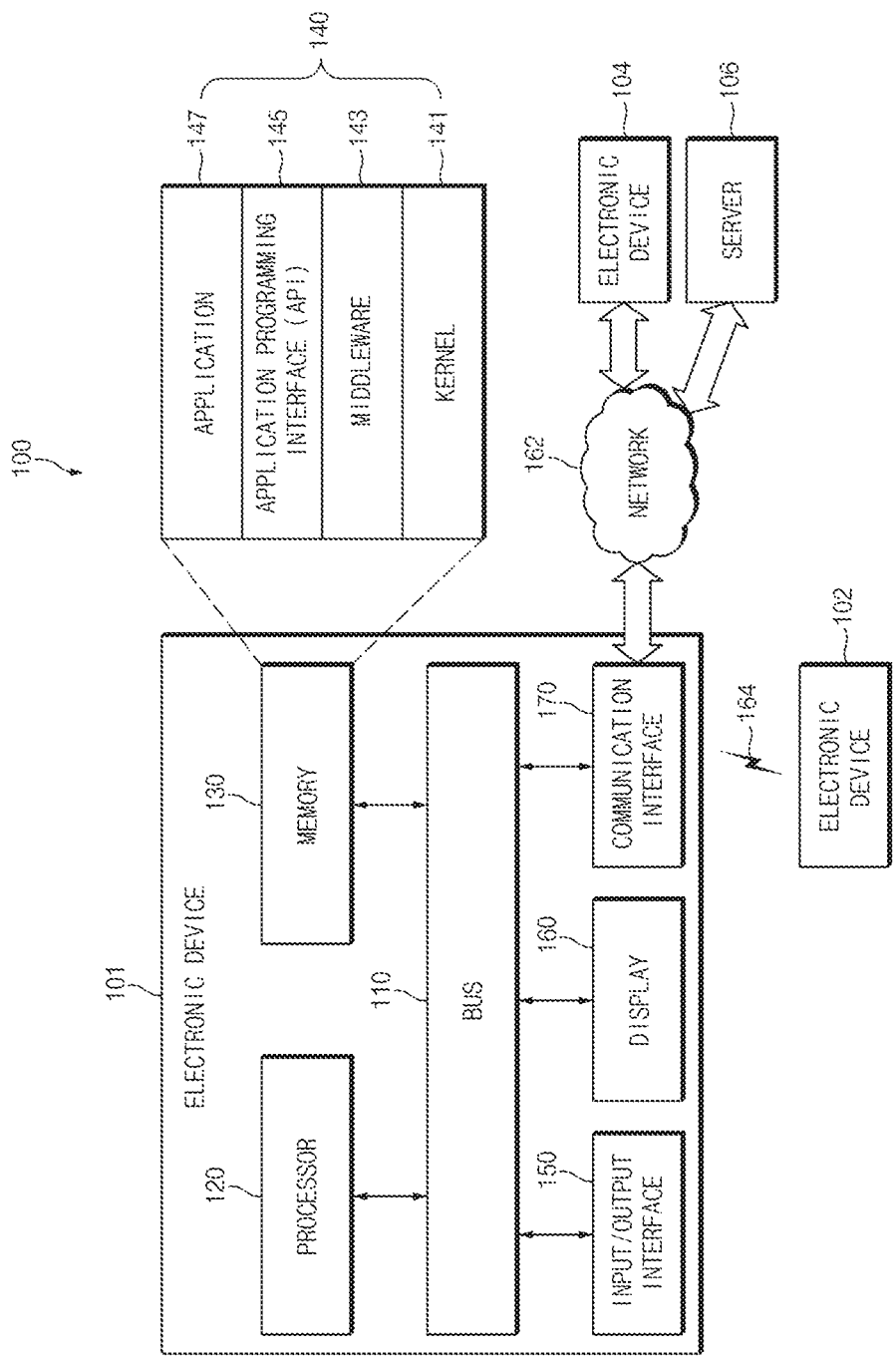
FIG. 1 illustrates an electronic device in a network environment system, according to various embodiments.

Hereinafter, various embodiments of the disclosure may be described Referring to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described Referring to the accompanying drawings. In the disclosure, the term "user" may refer to a person who uses an electronic device or may refer to a device (e.g., an artificial intelligence electronic device) that uses the electronic device.

FIG. 1 illustrates an electronic device in a network environment system, according to various embodiments.

Referring to FIG. 1, according to various embodiments, an electronic device 101, a first electronic device 102, a second electronic device 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic device 101.

The memory 130 may include a volatile and/or nonvolatile memory. For example, the memory 130 may store commands or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 164. The short range communication 164 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
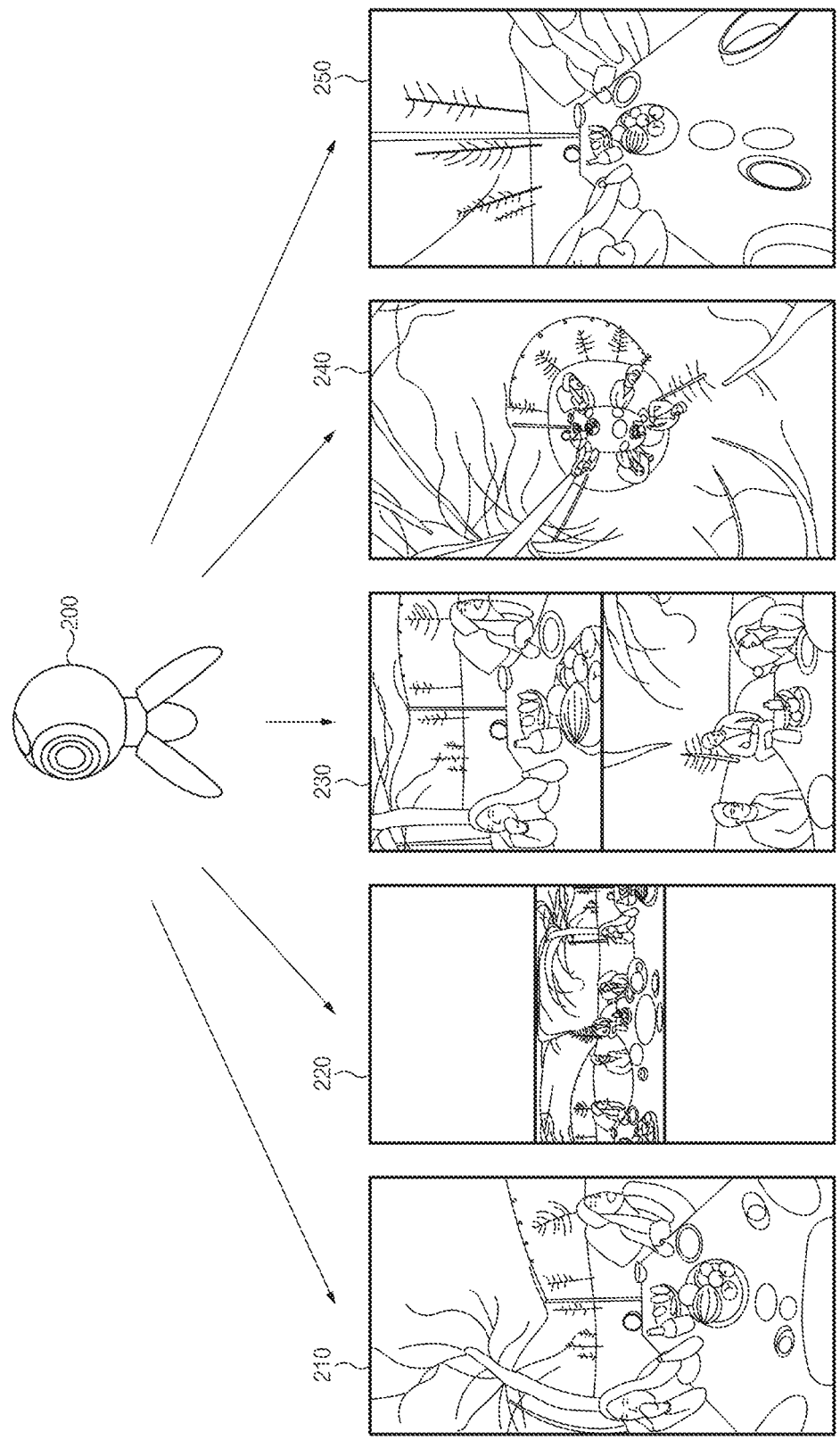
FIG. 2 illustrates changes of an image captured by a camera in accordance with a first mode to a fifth mode according to various embodiments.

FIG. 2 illustrates changes of an image captured by a camera 200 in accordance with a first mode to a fifth mode according to various embodiments. Herein, the description in FIG. 1 may be applied equally to components having the same reference numerals as in the electronic device 101 described in FIG. 1.

Referring to FIG. 2, the electronic device 101 may change the image captured by the camera 200 in accordance with the first mode to the fifth mode of an application. The application may be a program capable of editing the image, and the first mode to the fifth mode may be a manner for outputting the image in the application. For example, the first mode may be a 360° view mode (or 360 mode), the second mode may be a panorama view mode, the third mode may be a dual view mode, the fourth mode may be a round view mode, and the fifth mode may be a stretched view mode. The first to fifth modes described above are exemplary and embodiments of the disclosure are not limited to the specific modes changed in the electronic device 101.

As the mode is changed, the electronic device 101 may output an image corresponding to the changed mode. For example, the electronic device 101 may change an image corresponding to the first mode (hereinafter referred to as a first image 210) to an image corresponding to the second mode (hereinafter referred to as a second image 220) and output the second image 220. In other words, a user may change the mode from the first mode to the second mode. In addition, when the mode is changed, the electronic device 101 may change the first image 210 to the second image 220 and output the second image 220. In the above-described example, it is described that the electronic device 101 changes the first image 210 to the second image 220 and outputs the second image 220. However, the electronic device 101 may change the first image 210 to a fifth image 250 corresponding to the fifth mode and output the fifth image 250.

The camera 200 may be a camera capable of capturing surrounding environment from all angles. For example, the camera 200 may be a 360° camera or a 360° stereo camera. The camera 200 may include a plurality of lenses. In addition, images respectively captured via the plurality of lenses may be different from each other. The camera 200 may transmit the images respectively captured via the plurality of lenses to the electronic device 101, and the electronic device 101 may combine the images and output a combined image. The camera 200 may combine the images respectively captured via the plurality of lenses and transmit the combined image to the electronic device 101.

Figure 3:
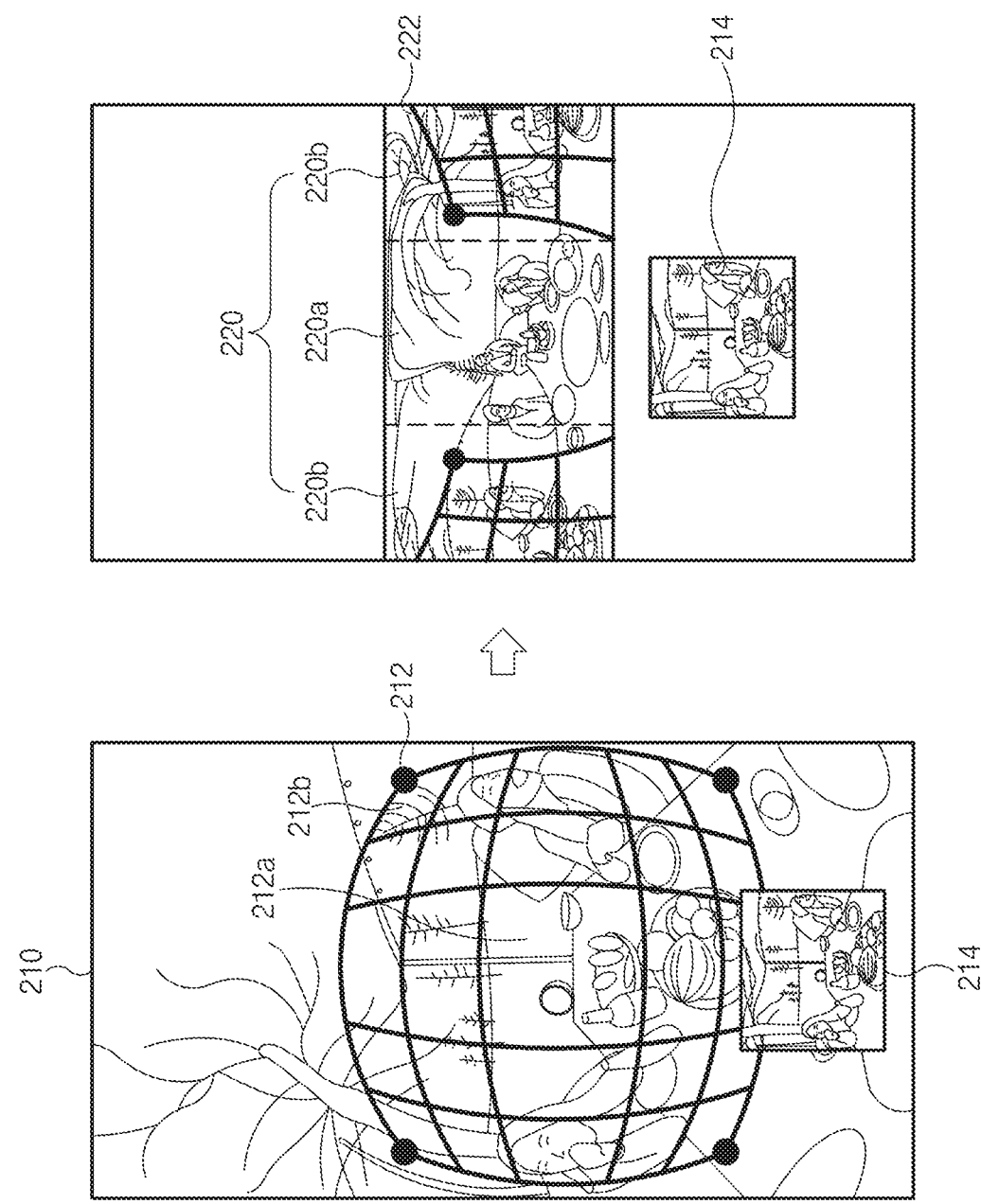
FIG. 3 illustrates an electronic device displaying a second guide on a second image such that the same preview is output when changing a first image to a second image, according to various embodiments.

FIG. 3 illustrates the electronic device 101 displaying a second guide 222 on the second image 220 such that the same preview 214 is output when changing the first image 210 to the second image 220, according to various embodiments.

Referring to FIG. 3, the processor 120 may output the first image 210, a first guide 212, and the preview 214 on the display 160 in the first mode of the application. The first guide 212 may be an indicator indicating an area to be cropped in the first image 210. The preview 214 may be an image in which the area to be cropped is corrected. When the user executes the first mode, the processor 120 may simultaneously output the first image 210, the first guide 212, and the preview 214 or may sequentially output the first image 210, the first guide 212, and the preview 214. In addition, the processor 120 may output the preview 214 in an area adjacent to the first guide 212 or to a specified area.

The user may change the output mode of the image from the first mode to the second mode. The processor 120 may output the second image 220 on the display 160 in response to a user input for changing the output mode from the first mode to the second mode. When the second image 220 is output, the processor 120 may output the second guide 222 on the display 160 such that the preview 214 identical to the preview 214 corresponding to the first guide 212 is output.

For example, as shown in FIG. 3, the first image 210 is an image corresponding to the 360° view mode. The first image 210 may be an image captured via front and rear lenses of the 360° camera 200 and transformed into a spherical shape. The user may enlarge or rotate the first image 210 to identify all images captured via the front and rear lenses of the 360° camera 200. The second image 220 is an image corresponding to the panorama view mode. An image 220a captured via the front lens of the 360° camera 200 may be present on a middle area of the second image 220. Further, an image 220b captured via the rear lens of the 360° camera 200 may be present on both side areas of the second image 220, or vice versa.

When the first guide 212 is displayed on an image captured via the rear lens of the 360° camera 200 in the first image 210 as shown in FIG. 3, an image output on the preview 214 may also be a part of the image captured via the rear lens of the 360° camera 200. When the user changes the mode from the first mode to the second mode, the same preview 214 must be output. Thus, the processor 120 may display the second guide 222 on the image 220*b* captured via the rear lens of the 360° camera 200 in the second image 220. In the image changed in accordance with the panorama view mode, the image 220*b* captured via the rear lens presents on the both side areas of the image. Thus, the processor 120 may display the second guide 222 on the both side areas of the second image 220. According to various embodiments of the disclosure, the user may recognize a corrected area by changing the guide and displaying the changed guide on the image such that the same preview 214 is output even though the image is changed in accordance with the mode change.

According to various embodiments of the disclosure, the processor 120 may output the first guide 212 on the display 160 based on a curvature of the first image 210. For example, the processor 120 may output the first guide 212 by increasing a curvature of the guide on a portion with large distortion of the image and decreasing the curvature of the guide on a portion with small distortion of the image. In FIG. 3, a curvature of the guide on a side area of the first image 210 may be greater than a curvature of the guide on a middle area of the first image 210. In the above description, it is described that the processor 120 outputs the first guide 212 on the display 160 based on the curvature of the first image 210. However, the above-described embodiment may also be applied to the second image 220 and the second guide 222. According to various embodiments of the disclosure, the guide is output based on the curvature of the image such that the user may easily recognize a degree of correction of the distorted area.

According to various embodiments of the disclosure, the processor 120 may divide the first guide 212 into a plurality of blocks and output the divided blocks on the display 160. When the first guide 212 is divided into the plurality of blocks, the processor 120 may output the first guide 212 for each block based on the curvature of the image. For example, a center block 212*a* of the first guide 212 is distorted such that a proportion of the block 212*a* in the image 210 is larger than an actual proportion. Therefore, when the preview 214 is changed, a size of the block 212*a* may be reduced. On the other hand, a block 212*b* is distorted such that a proportion of the block 212*b* in the image 210 is smaller than an actual proportion. Therefore, when the preview 214 is changed, a size of the block 212*b* may be enlarged. In the above description, it is described that the processor 120 outputs the first guide 212 for each block based on the curvature of the first image 210. However, the above-described embodiment may also be applied to the second image 220 and the second guide 222.

Figure 4:
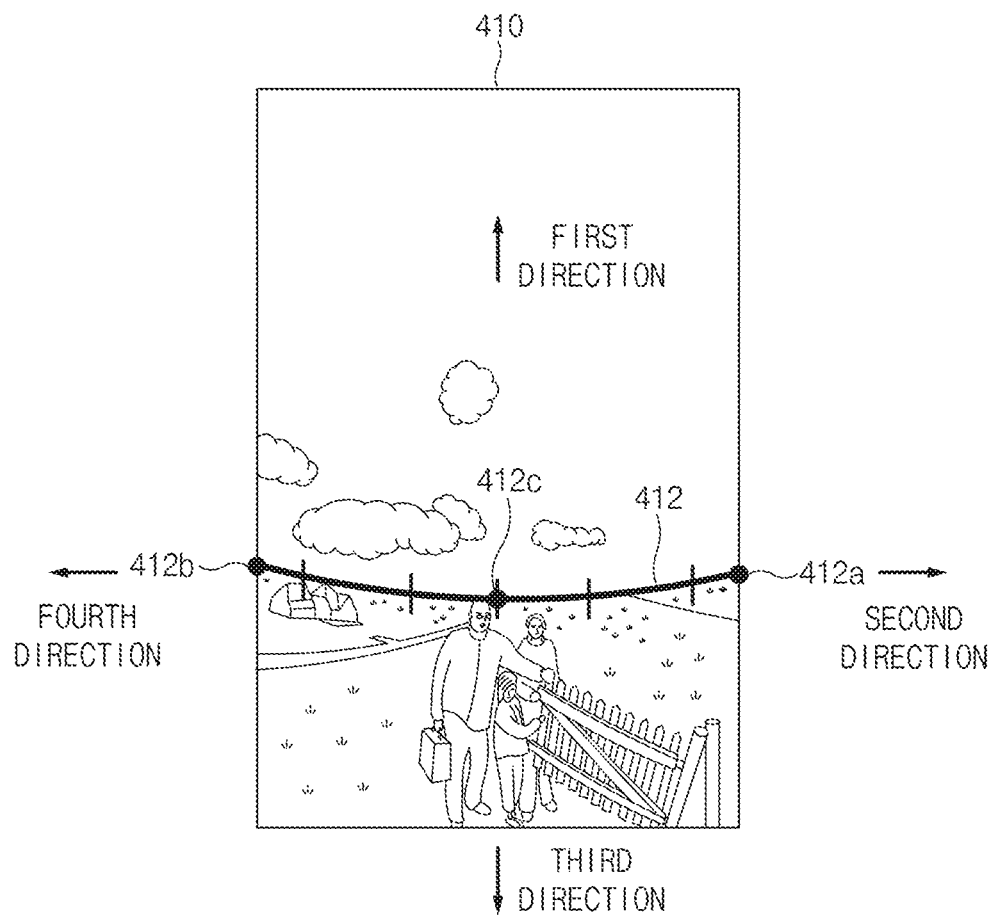
FIG. 4 illustrates an electronic device that outputs a line for correcting a levelness on an image, according to various embodiments.

FIG. 4 illustrates the electronic device 101 that outputs a line 412 for correcting a levelness on an image 410, according to various embodiments.

Referring to FIG. 4, the processor 120 may correct a levelness of an image 410 using the line 412 for correcting the levelness of the image. For example, in response to a user input, the processor 120 may move one of both ends 412*a* and 412*b* of the line 412 in a first direction or a third direction to change the levelness.

According to various embodiments, the processor 120 may output, on the display 160, the line 412 for correcting the levelness of the image based on a curvature of the image 410. For example, in FIG. 4, because the image 410 is distorted in the third direction, the line 412 for correcting the levelness may also be displayed bent in the third direction.

According to various embodiments, the processor 120 may correct the distortion using the line 412 for correcting the levelness of the image. For example, a cursor 412*c* may be present on the line 412 for correcting the levelness. When the cursor 412*c* is moved in the first direction in response to a user input, the processor 120 may correct the line 412 bent in the third direction to a straight line. The processor 120 may correct the image 410 distorted in the third direction while correcting the line 412 bent in the third direction to the straight line.

The processor 120 may adjust the image 410 output on the display 160 using the cursor 412*c*. For example, when the cursor 412*c* is moved in a second direction, the processor 120 may output at least a portion of the image 410 located in the second direction on the display 160. The first to fourth directions described above are provided for convenience of description. However, the first to fourth directions may become any direction on the display 160. Herein, the image may be one of the images respectively corresponding to the first to fifth modes described in FIG. 2.

Figure 5A:
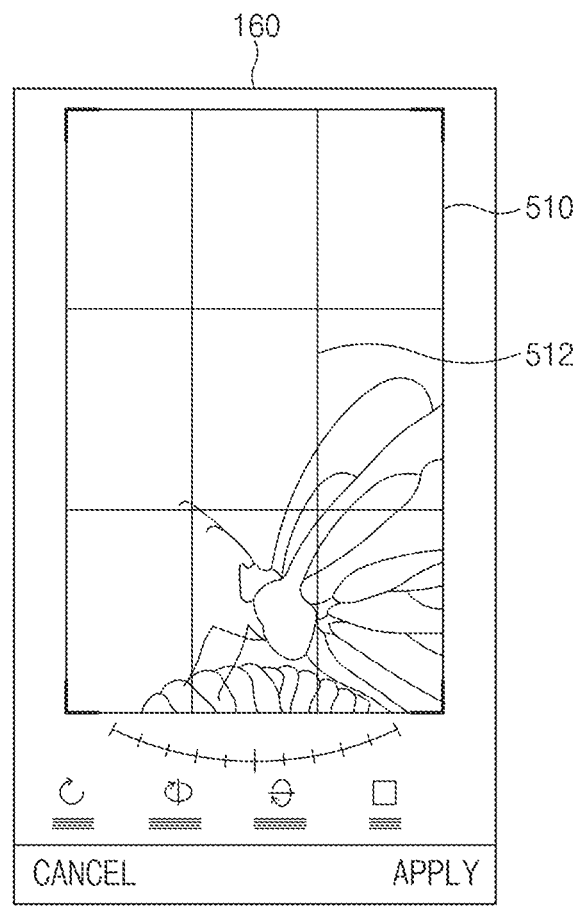
FIG. 5A illustrates an electronic device that obtains dominant color of an area output on a display, sets a guide in a complementary color to the dominant color, and outputs the guide on the display, according to various embodiments.
Figure 5B:
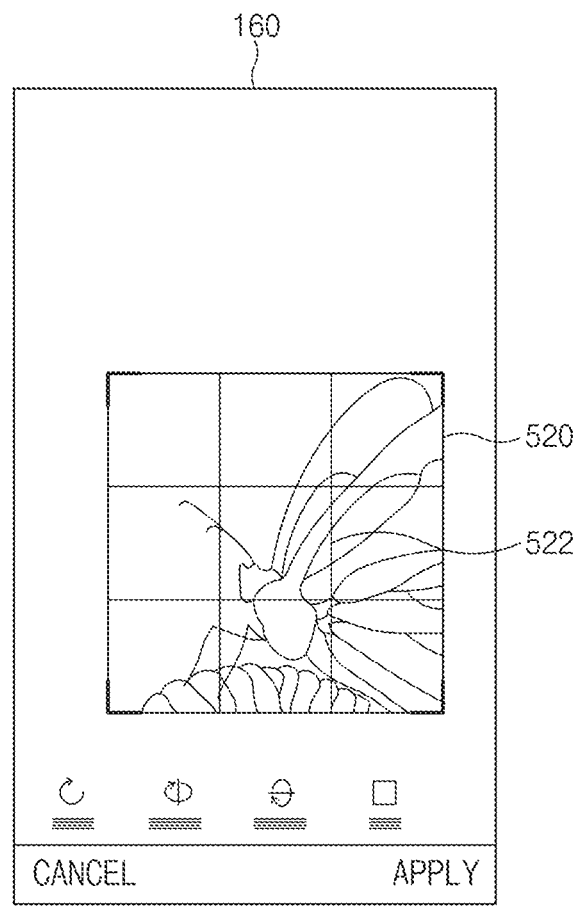
FIG. 5B illustrates an electronic device that obtains dominant color of a cropped area, changes color of a guide, and outputs the guide on a display, according to various embodiments.

FIG. 5A illustrates the electronic device 101 that obtains dominant color of an area 510 output on the display 160, sets a guide 512 in complementary color to the dominant color, and outputs the guide 512 on the display 160, according to various embodiments. FIG. 5B illustrates the electronic device 101 that obtains dominant color of a cropped area 520, changes color of a guide 522, and outputs the guide 522 on the display 160, according to various embodiments. An image illustrated in FIG. 5B is an image in which a portion of the image illustrated in FIG. 5A is cropped.

Referring to FIG. 5A, the processor 120 may obtain the dominant color of the area 510 output on the display 160. The dominant color may be a color that occupies the widest area of the area 510 output on the display 160. When the dominant color is obtained, the processor 120 may output, on the display 160, the guide 512 having the complementary color to the dominant color. The complementary color may be a color placed on an opposite side of the dominant color in a color circle. For example, when the dominant color is blue, the complementary color is orange, and when the dominant color is yellow, the complementary color may be dark blue.

Referring to FIG. 5A again, the area 510 output on the display 160 may be a butterfly image with a sky background. In FIG. 5A, the dominant color may be blue rather than yellow, because the sky occupies a larger area than the butterfly. Accordingly, the processor 120 may set the color of the guide 512 to orange, which is the complementary color of blue, and output the guide 512 on the display 160. According to various embodiments of the disclosure, visibility of the guide 512 may be increased by obtaining the dominant color of the image and setting the color of the guide 512 to the complementary color.

Referring to FIG. 5B, the area 520 output on the display 160 may be a partial area of the image 510 illustrated in FIG. 5A. For example, the image 520 illustrated in FIG. 5B may be an area cropped around the butterfly in the image 510 illustrated in FIG. 5A. Since the image is cropped around the butterfly, the dominant color of the area 520 output on the display 160 may be yellow. Accordingly, the processor 120 may set the color of the guide 522 to dark blue, which is the complementary color of yellow, and outputs the guide 522 on the display 160. According to various embodiments of the disclosure, the processor 120 may change the color of the guide 512 in real time whenever the image 510 is cropped, and output the guide 512 on the display 160. Since an area to be cropped may change each time the image 510 is cropped, the color of the guide 512 may also be changed continuously.

Figure 6A:
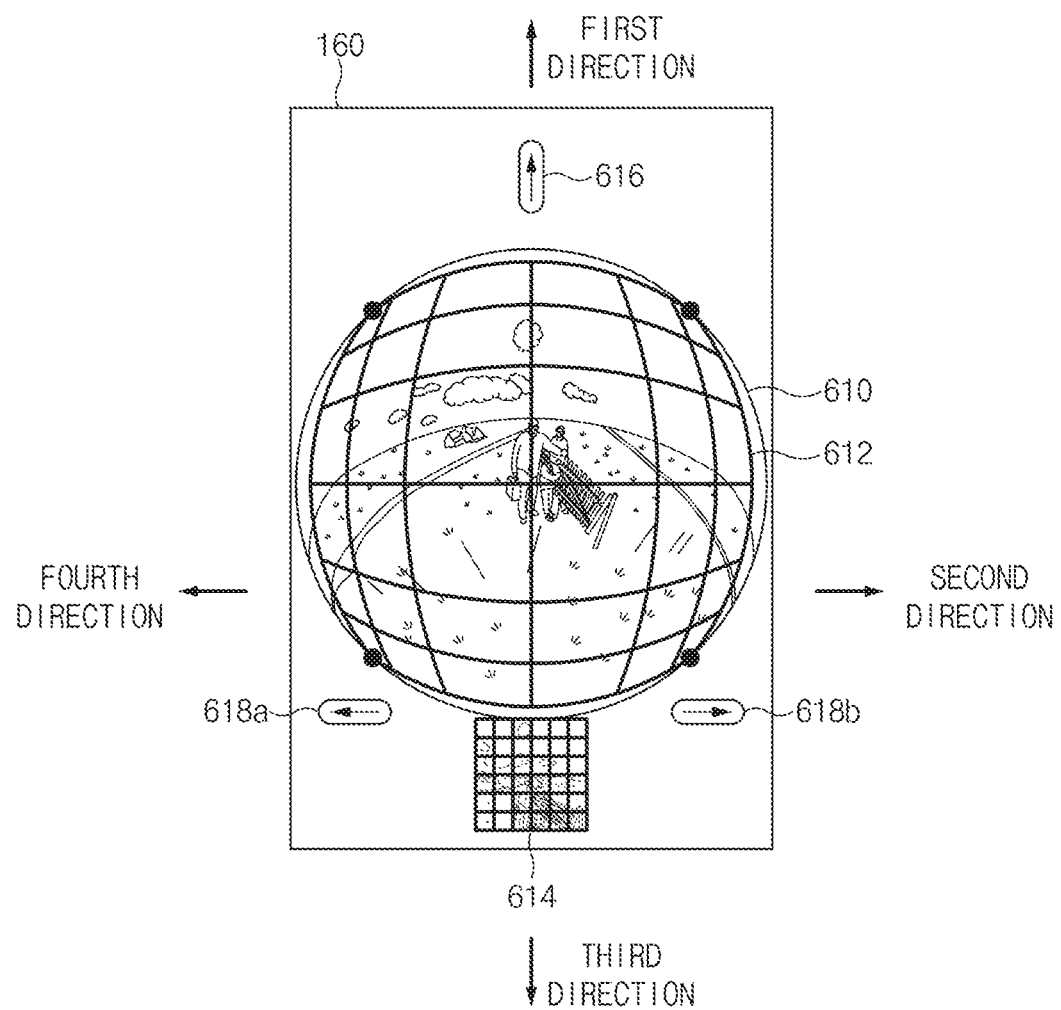
FIG. 6A illustrates an image corresponding to a 360° view mode and a preview, according to various embodiments.
Figure 6B:
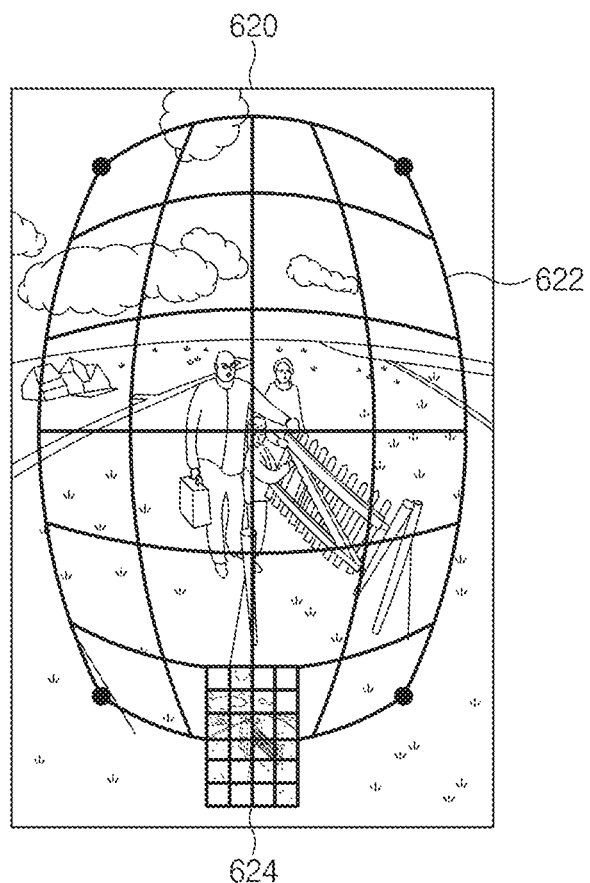
FIG. 6B illustrates an enlarged image of an image corresponding to a 360° view mode and a preview corresponding to the enlarged image, according to various embodiments.

FIG. 6A illustrates an image 610 corresponding to the 360° view mode and a preview, according to various embodiments. FIG. 6B illustrates an enlarged image 620 of the image corresponding to the 360° view mode and a preview corresponding to the enlarged image 620, according to various embodiments. A first image illustrated in FIG. 6B is an enlarged image of the image illustrated in FIG. 6A.

Referring to FIG. 6A, in response to a user input for changing the area 610 output on the display 160 in the image, the processor 120 may change a preview 614. For example, the user may change the area 610 on the display 160 in the image output using cursors 616, 618a, and 618b illustrated in FIG. 6A. When the user presses the cursor 616, the area 610 output on the display 160 may be changed in a first direction or a third direction. Further, when the user presses the cursor 616a or 616b, the area 610 output on the display 160 may be changed in a second direction or a fourth direction. When the area 610 output on the display 160 is changed, an area corresponding to the guide 612 is also changed. Therefore, the processor 120 may change the preview 614 in a corresponding manner to the guide 612.

Unlike the above example, referring to FIG. 6B, the user may drag the area 610 illustrated in FIG. 6A to enlarge the area 610. When the area 610 is enlarged, an area corresponding to a guide 622 is also changed. Thus, the processor 120 may change a preview 624. For example, in FIG. 6B, when the user enlarges the area 610, the area corresponding to the guide 622 may decrease. Because the area corresponding to the guide 622 decreases, an area output on the preview 624 may be smaller than an area output on the preview 614.

In FIGS. 6A and 6B, an embodiment of changing the area 610 and 620 output on the display 160 in the image to change the preview 614 and 624 was described. However, the preview 614 and 624 may be changed by dragging the guide 612 and 622. For example, the processor 120 may change the preview 614 and 624 in response to a user input for changing a size and/or position of the guide 612 and 622.

Referring to FIGS. 6A and 6B again, the user may change the size of the guide 612 and 622 using fingers, or change the position of the guide 612 and 622 by dragging the guide 612 and 622. When the size and/or position of the guide 612 and 622 is changed, the area corresponding to the guide 612 and 622 may also be changed. Therefore, the processor 120 may change the preview 614 and 624 in a corresponding manner to the guide 612 and 622. When the size of the guide 612 and 622 is increased or decreased, the processor 120 may increase or decrease a size of the preview 614 and 624 in a corresponding manner to the size of the guide 612 and 622.

Figure 7:
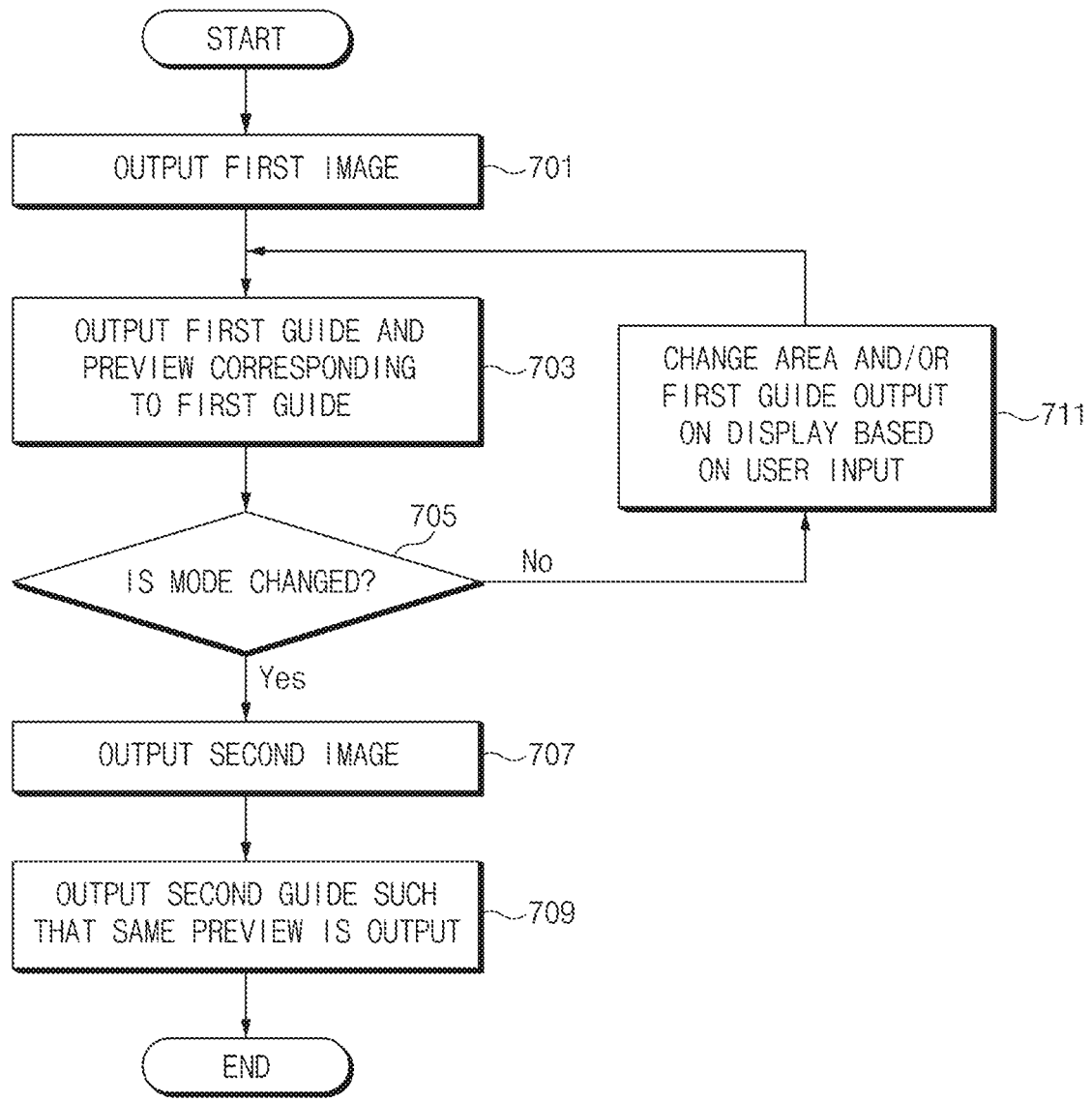
FIG. 7 illustrates a flowchart of operations of an electronic device according to various embodiments.

FIG. 7 illustrates a flowchart of operations of the electronic device 101 according to various embodiments.

Referring to FIG. 7, in operation 701, when the user selects the mode in the application, the processor 120 may output an image corresponding to the selected mode on the display 160. For example, when the user selects the first mode, the processor 120 may output the first image on the display 160. When the first image is output, in operation 703, the processor 120 may output the first guide and the preview corresponding to the first guide on the display 160. In one embodiment, the operations 701 and 703 may be performed substantially simultaneously.

When the first guide and the preview corresponding to the first guide is output, in operation 705, the processor 120 may determine whether the mode is changed. When the mode is changed from the first mode to the second mode, in operation 707, the processor 120 may output the second image corresponding to the second mode on the display 160. When the second image is output, in operation 709, the processor 120 may output the second guide on the display 160 such that the same preview as the preview corresponding to the first guide is output. The first mode and the second mode may be one of the first mode to the fifth mode described in FIG. 2.

When the mode is not changed, in operation 711, the processor 120 may change the area and/or the first guide output on the display based on the user input. According to various embodiments, the processor 120 may change the area output on the display based on the user input to change the preview. For example, when the area output on the display is changed, the area corresponding to the guide is also changed as shown in FIGS. 6A and 6B. Therefore, the processor 120 may change the preview in a corresponding manner to the guide.

According to various embodiments, the processor may change the preview based on the user input for changing the position, size, or the like of the first guide. For example, as described in FIGS. 6A and 6B, when the user changes the position of the guide, the processor 120 may allow the area corresponding to the guide to be output on the preview.

Figure 8A:
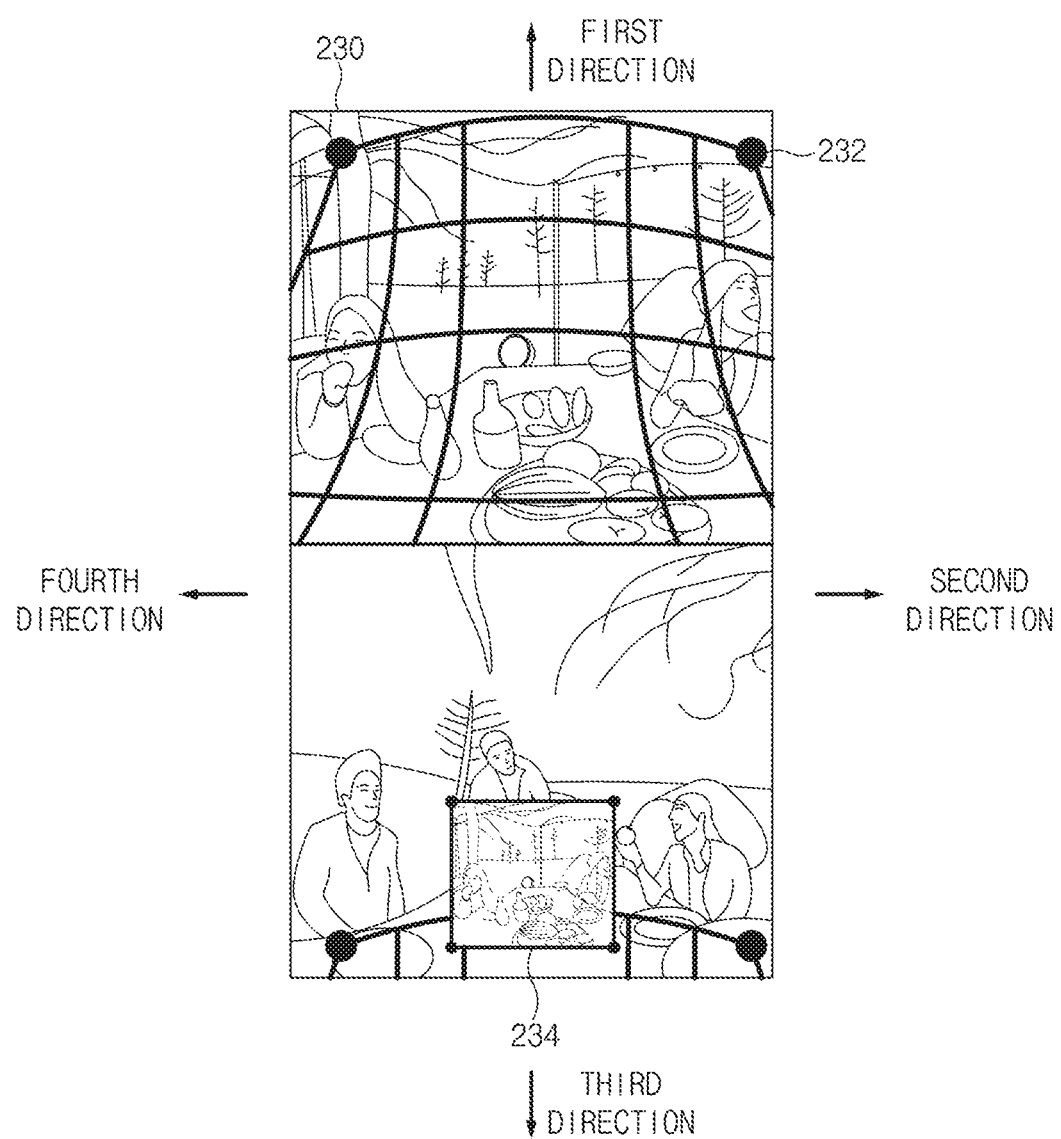
FIG. 8A illustrates an image corresponding to a dual view mode and a preview, according to various embodiments.
Figure 8B:
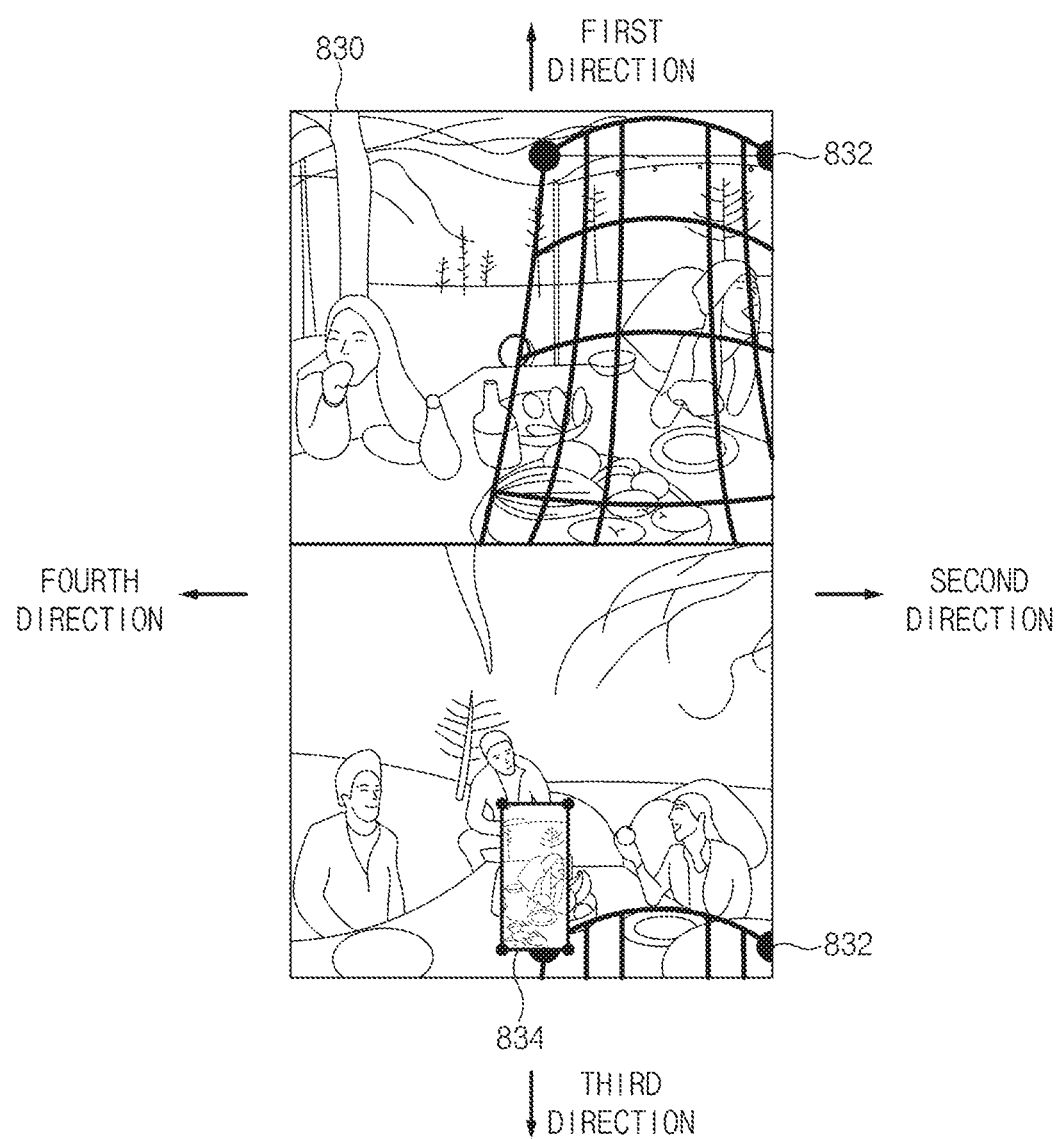
FIG. 8B illustrates changing a guide in a corresponding manner to a changed preview, according to various embodiments.

FIG. 8A illustrates an image corresponding to the dual view mode and a preview, according to various embodiments. FIG. 8B illustrates changing the guide in a corresponding manner to a changed preview, according to various embodiments. The guide and preview illustrated in FIG. 8B are respectively derived from the guide and preview illustrated in FIG. 8A. FIGS. 1 to 7 illustrate an embodiment of changing the image or the guide to change the preview. In addition, FIGS. 8A and 8B illustrate an embodiment of changing the preview to change the image or the guide.

Referring to FIGS. 8A and 8B, the processor 120 may output an image 230. The image 230 illustrated in FIG. 8A may be an image corresponding to the dual view mode described in FIG. 2. When the image 230 is output, the processor 120 may output a guide 232 and a preview 234 corresponding to the guide 232 on the display 160. When the guide 232 and the preview 234 are output, in response to a user input for changing the preview 234, the processor 120 may change the guide 232 in a corresponding manner to a changed preview 834.

For example, in FIG. 8A, the preview 234 is outputting an entire area in a first direction of the image 230. In addition, the guide 232 may be present in the entire area in the first direction of the image 230 so as to correspond to the preview 234. However, as shown in FIG. 8B, when the user reduces a size of the preview 234 to output a partial area in the first direction of the image 230, the processor 120 may change the guide 232 in a corresponding manner to the changed preview 834. The processor 120 may change at least one of position, size, and shape of the guide 232 to output a guide 832 in a corresponding manner to the changed preview 834.

According to various embodiments of the disclosure, the processor 120 may change an area output on the display 160 in the image 830 in a corresponding manner to the changed preview 834. For example, in FIGS. 8A and 8B, when the user reduces the size of the preview 234 to output the partial area in the first direction of the image 230, the processor 120 may enlarge the image 230 to output the partial area in the first direction on the preview 834. When the processor enlarges the image 230, the guide 232 may be fixed or may be changed with the image.

According to various embodiments of the disclosure, in response to a user input for controlling an image output on the preview 234, the processor 120 may control the area output on the display 160 in the image 230. For example, when the user touches the preview 234 to drag the preview 234 in the first direction, an image output on the preview 234 may be changed to a partial area in a third direction of the image 230. When the image output on the preview 234 is changed to the partial area in the third direction, the processor 120 may control the area in the image 230 to be output on the display 160 to be the partial area in the third direction.

According to various embodiments of the disclosure, the guide or the image is controlled through the preview. Thus, the user may easily recognize an original image corresponding to the preview and a corrected area in the original image.

An electronic device according to one embodiment of the disclosure includes a display, a memory that stores an application for editing an image, and a processor that outputs the image through the application onto the display. The processor may be configured to output, on the display, the image, a first guide indicating an area to be cropped in the image, and a preview corresponding to the first guide in a first mode of the application. Further, the processor may be configured to output, on the display, an image changed in accordance with a second mode in response to a user input to change a mode of the application from the first mode to the second mode. Further, the processor may be configured to output a second guide corresponding to the second mode on the display such that the preview corresponding to the first guide is output.

The processor according to one embodiment of the disclosure may be configured to output the preview on the display in an area adjacent to the first guide and the second guide.

The processor according to one embodiment of the disclosure may be configured to output the first guide on the display based on a curvature of the image.

The processor according to one embodiment of the disclosure may be configured to output, on the display, a line for correcting a levelness of the image based on a curvature of the image.

The processor according to one embodiment of the disclosure may be configured to obtain a dominant color of an area output on the display in the image, and to output, on the display, the first guide having a complementary color to the dominant color.

In response to a user input for changing a size of the first guide, the processor according to one embodiment of the disclosure may be configured to change the preview in a corresponding manner to the changed size of the first guide.

In response to a user input for changing a position of the first guide on the image, the processor according to one embodiment of the disclosure may be configured to change the preview in a corresponding manner to the changed position of the first guide.

In response to a user input for changing an area output on the display in the image, the processor according to one embodiment of the disclosure may be configured to change the preview in a corresponding manner to the first guide present in the changed area.

The processor according to one embodiment of the disclosure may be configured to divide the first guide into a plurality of blocks and output the plurality of blocks on the display.

An electronic device according to one embodiment of the disclosure includes a display, a memory that stores an application for editing an image, and a processor that outputs the image through the application onto the display. The processor may be configured to output, on the display, the image, a guide indicating an area to be cropped in the image, and a preview corresponding to the guide. The processor may be configured to change the guide or an area output on the display in the image in response to a user input for changing the preview.

The processor according to one embodiment of the disclosure may be configured to change at least one of a position, size, and a shape of the guide so as to correspond to the changed preview.

The processor according to one embodiment of the disclosure may be configured to output, on the display, the guide based on a curvature of the image.

The processor according to one embodiment of the disclosure may be configured to obtain a dominant color of an area output on the display in the image, and to output, on the display, the guide having a complementary color to the dominant color.

The processor according to one embodiment of the disclosure may be configured to divide the guide into a plurality of blocks and output the plurality of blocks on the display.

A method for outputting a guide in an electronic device according to one embodiment of the disclosure may include outputting, on a display, an image, a first guide indicating an area to be cropped in the image, and a preview corresponding to the first guide in a first mode of an application, outputting, in response to a user input for changing the first mode to a second mode, an image changed in accordance with the second mode on the display, and outputting a second guide corresponding to the second mode on the display such that the preview corresponding to the first guide is output.

The outputting, on the display, of the image, the first guide indicating the area to be cropped in the image, and the preview corresponding to the first guide in the first mode of the application according to one embodiment of the disclosure may include outputting the preview on the display in an area adjacent to the first guide.

The outputting, on the display, of the image, the first guide indicating the area to be cropped in the image, and the preview corresponding to the first guide in the first mode of the application according to one embodiment of the disclosure may include outputting the first guide on the display based on a curvature of the image.

The method for outputting the guide according to one embodiment of the disclosure may further include outputting, on the display, a line for correcting a levelness of the image based on a curvature of the image.

The method for outputting the guide according to one embodiment of the disclosure may further include obtaining a dominant color of an area output on the display in the image, and outputting, on the display, the first guide having a complementary color to the dominant color.

The method for outputting the guide according to one embodiment of the disclosure may further include changing the preview, in response to a user input for changing a size of the first guide, in a corresponding manner to the changed size of the first guide.

Figure 9:
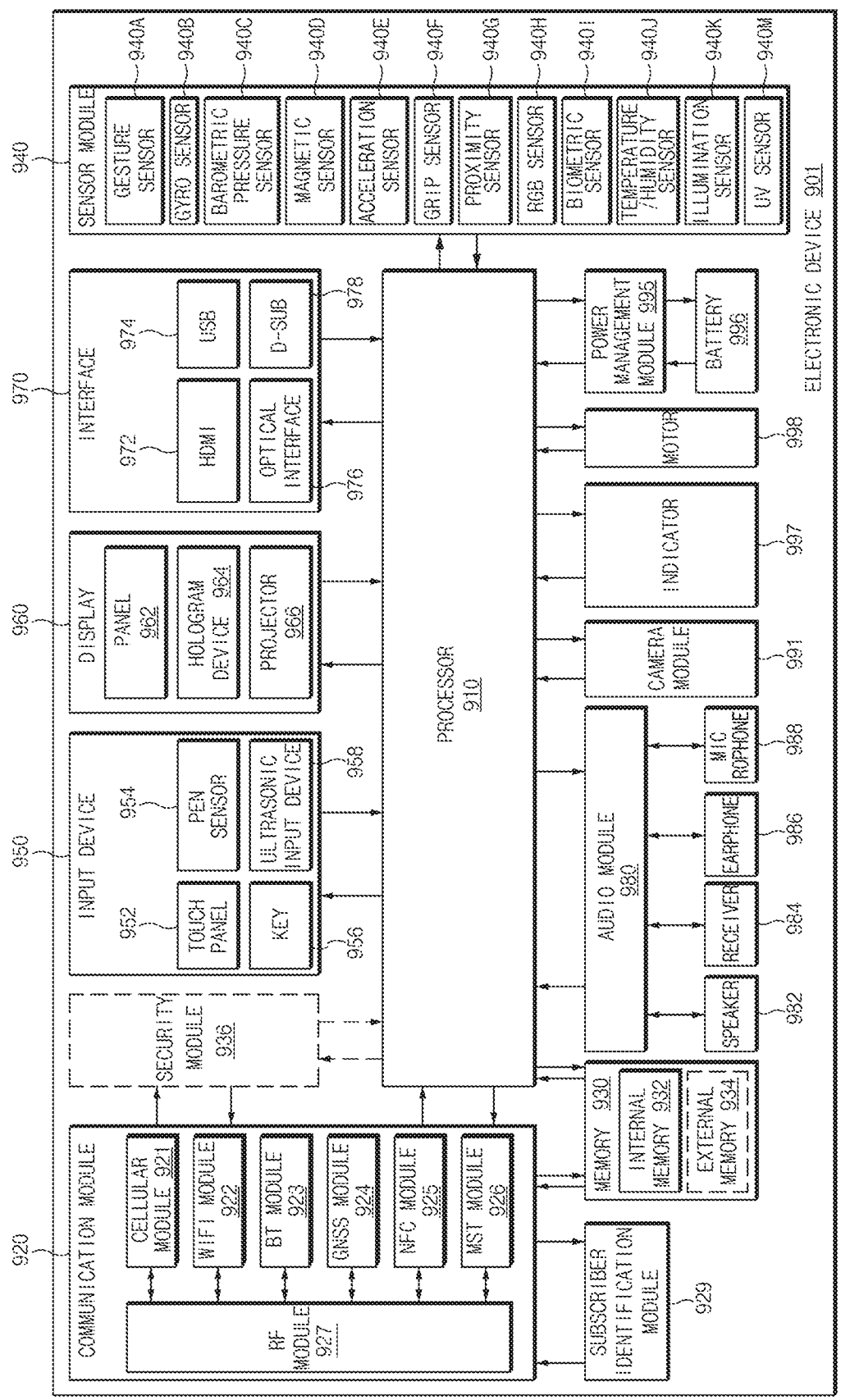
FIG. 9 illustrates a block diagram of an electronic device, according to various embodiments.

FIG. 9 illustrates a block diagram of an electronic device, according to various embodiments.

Referring to FIG. 9, an electronic device 901 may include, for example, all or a part of the electronic device 101 illustrated in FIG. 1. The electronic device 901 may include one or more processors (e.g., an application processor (AP)) 910, a communication module 920, a subscriber identification module 924, a memory 930, a sensor module 940, an input device 950, a display 960, an interface 970, an audio module 980, a camera module 991, a power management module 995, a battery 996, an indicator 997, and a motor 998.

The processor 910 may drive, for example, an operating system (OS) or an application to control a plurality of hardware or software components connected to the processor 910 and may process and compute a variety of data. For example, the processor 910 may be implemented with a System on Chip (SoC). According to an embodiment, the processor 910 may further include a graphic processing unit (GPU) and/or an image signal processor. The processor 910 may include at least a part (e.g., a cellular module 921) of components illustrated in FIG. 9. The processor 910 may load a command or data, which is received from at least one of other components (e.g., a nonvolatile memory), into a volatile memory and process the loaded command or data. The processor 910 may store a variety of data in the nonvolatile memory.

The communication module 920 may be configured the same as or similar to the communication interface 170 of FIG. 1. The communication module 920 may include the cellular module 921, a Wi-Fi module 922, a Bluetooth (BT) module 923, a GNSS module 924 (e.g., a GPS module, a Glonass module, a Beidou module, or a Galileo module), a near field communication (NFC) module 925, a MST module 926 and a radio frequency (RF) module 927.

The cellular module 921 may provide, for example, voice communication, video communication, a character service, an Internet service, or the like over a communication network. According to an embodiment, the cellular module 921 may perform discrimination and authentication of the electronic device 901 within a communication network by using the subscriber identification module (e.g., a SIM card) 929. According to an embodiment, the cellular module 921 may perform at least a portion of functions that the processor 910 provides. According to an embodiment, the cellular module 921 may include a communication processor (CP).

Each of the Wi-Fi module 922, the BT module 923, the GNSS module 924, the NFC module 925, or the MST module 926 may include a processor for processing data exchanged through a corresponding module, for example. According to an embodiment, at least a part (e.g., two or more) of the cellular module 921, the Wi-Fi module 922, the BT module 923, the GNSS module 924, the NFC module 925, or the MST module 926 may be included within one Integrated Circuit (IC) or an IC package.

For example, the RF module 927 may transmit and receive a communication signal (e.g., an RF signal). For example, the RF module 927 may include a transceiver, a power amplifier module (PAM), a frequency filter, a low noise amplifier (LNA), an antenna, or the like. According to another embodiment, at least one of the cellular module 921, the Wi-Fi module 922, the BT module 923, the GNSS module 924, the NFC module 925, or the MST module 926 may transmit and receive an RF signal through a separate RF module.

The subscriber identification module 929 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 930 (e.g., the memory 130) may include an internal memory 932 or an external memory 934. For example, the internal memory 932 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 934 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 934 may be operatively and/or physically connected to the electronic device 901 through various interfaces.

A security module 936 may be a module that includes a storage space of which a security level is higher than that of the memory 930 and may be a circuit that guarantees safe data storage and a protected execution environment. The security module 936 may be implemented with a separate circuit and may include a separate processor. For example, the security module 936 may be in a smart chip or a secure digital (SD) card, which is removable, or may include an embedded secure element (eSE) embedded in a fixed chip of the electronic device 901. Furthermore, the security module 936 may operate based on an operating system (OS) that is different from the OS of the electronic device 901. For example, the security module 936 may operate based on java card open platform (JCOP) OS.

The sensor module 940 may measure, for example, a physical quantity or may detect an operation state of the electronic device 901. The sensor module 940 may convert the measured or detected information to an electric signal. For example, the sensor module 940 may include at least one of a gesture sensor 940A, a gyro sensor 940B, a barometric pressure sensor 940C, a magnetic sensor 940D, an acceleration sensor 940E, a grip sensor 940F, the proximity sensor 940G, a color sensor 940H (e.g., red, green, blue (RGB) sensor), a biometric sensor 940I, a temperature/humidity sensor 940J, an illuminance sensor 940K, or an UV sensor 940M. Although not illustrated, additionally or alternatively, the sensor module 940 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 940 may further include a control circuit for controlling at least one or more sensors included therein. According to an embodiment, the electronic device 901 may further include a processor that is a part of the processor 910 or independent of the processor 910 and is configured to control the sensor module 940. The processor may control the sensor module 940 while the processor 910 remains at a sleep state.

The input device 950 may include, for example, a touch panel 952, a (digital) pen sensor 954, a key 956, or an ultrasonic input unit 958. For example, the touch panel 952 may use at least one of capacitive, resistive, infrared and ultrasonic detecting methods. Also, the touch panel 952 may further include a control circuit. The touch panel 952 may further include a tactile layer to provide a tactile reaction to a user.

The (digital) pen sensor 954 may be, for example, a part of a touch panel or may include an additional sheet for recognition. The key 956 may include, for example, a physical button, an optical key, a keypad, or the like. The ultrasonic input device 958 may detect (or sense) an ultrasonic signal, which is generated from an input device, through a microphone (e.g., a microphone 988) and may identify data corresponding to the detected ultrasonic signal.

The display 960 (e.g., the display 160) may include a panel 962, a hologram device 964, or a projector 966. The panel 962 may be the same as or similar to the display 160 illustrated in FIG. 1. The panel 962 may be implemented, for example, to be flexible, transparent or wearable. The panel 962 and the touch panel 952 may be integrated into a single module. The hologram device 964 may display a stereoscopic image in a space using a light interference phenomenon. The projector 966 may project light onto a screen so as to display an image. For example, the screen may be arranged in the inside or the outside of the electronic device 901. According to an embodiment, the display 960 may further include a control circuit for controlling the panel 962, the hologram device 964, or the projector 966.

The interface 970 may include, for example, a high-definition multimedia interface (HDMI) 972, a universal serial bus (USB) 974, an optical interface 976, or a D-subminiature (D-sub) 978. The interface 970 may be included, for example, in the communication interface 170 illustrated in FIG. 1. Additionally or alternatively, the interface 970 may include, for example, a mobile high definition link (MHL) interface, a SD card/multi-media card (MMC) interface, or an infrared data association (IrDA) standard interface.

The audio module 980 may convert a sound and an electric signal in dual directions. At least a component of the audio module 980 may be included, for example, in the input/output interface 150 illustrated in FIG. 1. The audio module 980 may process, for example, sound information that is input or output through a speaker 982, a receiver 984, an earphone 986, or the microphone 988.

For example, the camera module 991 may shoot a still image or a video. According to an embodiment, the camera module 991 may include at least one or more image sensors (e.g., a front sensor or a rear sensor), a lens, an image signal processor (ISP), or a flash (e.g., an LED or a xenon lamp).

The power management module 995 may manage, for example, power of the electronic device 901. According to an embodiment, a power management integrated circuit (PMIC), a charger IC, or a battery or fuel gauge may be included in the power management module 995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 996 and a voltage, current or temperature thereof while the battery is charged. The battery 996 may include, for example, a rechargeable battery and/or a solar battery.

The indicator 997 may display a specific state of the electronic device 901 or a part thereof (e.g., the processor 910), such as a booting state, a message state, a charging state, and the like. The motor 998 may convert an electrical signal into a mechanical vibration and may generate the following effects: vibration, haptic, and the like. Although not illustrated, a processing device (e.g., a GPU) for supporting a mobile TV may be included in the electronic device 901. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 10:
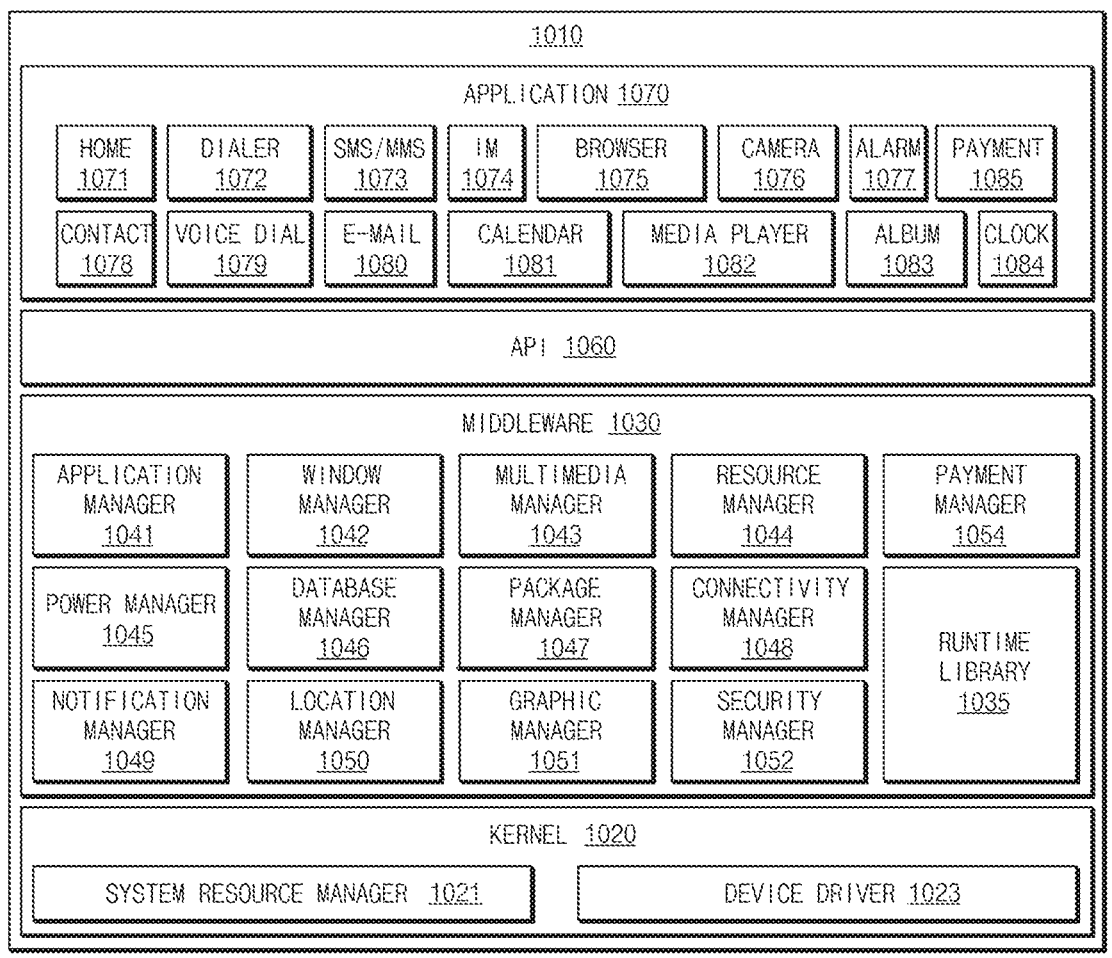
FIG. 10 illustrates a block diagram of a program module, according to various embodiments.

FIG. 10 illustrates a block diagram of a program module, according to various embodiments.

According to an embodiment, a program module 1010 (e.g., the program 140) may include an operating system (OS) to control resources associated with an electronic device (e.g., the electronic device 101), and/or diverse applications (e.g., the application program 147) driven on the OS. The OS may be, for example, Android™, iOS™ Windows™, Symbian™, or Tizen™.

The program module 1010 may include a kernel 1020, a middleware 1030, an application programming interface (API) 1060, and/or an application 1070. At least a portion of the program module 1010 may be preloaded on an electronic device or may be downloadable from an external electronic device (e.g., the first electronic device 102, the second electronic device 104, the server 106, or the like).

The kernel 1020 (e.g., the kernel 141) may include, for example, a system resource manager 1021 or a device driver 1023. The system resource manager 1021 may perform control, allocation, or retrieval of system resources. According to an embodiment, the system resource manager 1021 may include a process managing unit, a memory managing unit, or a file system managing unit. The device driver 1023 may include, for example, a display driver, a camera driver, a Bluetooth driver, a shared memory driver, a USB driver, a keypad driver, a Wi-Fi driver, an audio driver, or an inter-process communication (IPC) driver.

The middleware 1030 may provide, for example, a function that the application 1070 needs in common, or may provide diverse functions to the application 1070 through the API 1060 to allow the application 1070 to efficiently use limited system resources of the electronic device. According to an embodiment, the middleware 1030 (e.g., the middleware 143) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, a security manager 1052, or a payment manager 1054.

The runtime library 1035 may include, for example, a library module that is used by a compiler to add a new function through a programming language while the application 1070 is being executed. The runtime library 1035 may perform input/output management, memory management, or capacities about arithmetic functions.

The application manager 1041 may manage, for example, a life cycle of at least one application of the application 1070. The window manager 1042 may manage a graphic user interface (GUI) resource that is used in a screen. The multimedia manager 1043 may identify a format necessary for playing diverse media files, and may perform encoding or decoding of media files by using a codec suitable for the format. The resource manager 1044 may manage resources such as a storage space, memory, or source code of at least one application of the application 1070.

The power manager 1045 may operate, for example, with a basic input/output system (BIOS) to manage a battery or power, and may provide power information for an operation of an electronic device. The database manager 1046 may generate, search for, or modify database that is to be used in at least one application of the application 1070. The package manager 1047 may install or update an application that is distributed in the form of package file.

The connectivity manager 1048 may manage, for example, wireless connection such as Wi-Fi or Bluetooth. The notification manager 1049 may display or notify an event such as arrival message, appointment, or proximity notification in a mode that does not disturb a user. The location manager 1050 may manage location information about an electronic device. The graphic manager 1051 may manage a graphic effect that is provided to a user, or manage a user interface relevant thereto. The security manager 1052 may provide a general security function necessary for system security, user authentication, or the like. According to an embodiment, in the case where an electronic device (e.g., the electronic device 101) includes a telephony function, the middleware 1030 may further include a telephony manager for managing a voice or video call function of the electronic device.

The middleware 1030 may include a middleware module that combines diverse functions of the above-described components. The middleware 1030 may provide a module specialized to each OS kind to provide differentiated functions. Additionally, the middleware 1030 may dynamically remove a part of the preexisting components or may add new components thereto.

The API 1060 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1070 (e.g., the application program 147) may include, for example, one or more applications capable of providing functions for a home 1071, a dialer 1072, an SMS/MMS 1073, an instant message (IM) 1074, a browser 1075, a camera 1076, an alarm 1077, a contact 1078, a voice dial 1079, an e-mail 1080, a calendar 1081, a media player 1082, an album 1083, or a timepiece 1084, or for offering health care (e.g., measuring an exercise quantity, blood sugar, or the like) or environment information (e.g., information of barometric pressure, humidity, temperature, or the like).

According to an embodiment, the application 1070 may include an application (hereinafter referred to as "information exchanging application" for descriptive convenience) to support information exchange between an electronic device (e.g., the electronic device 101) and an external electronic device (e.g., the first electronic device 102 or the second electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1070 may include an application (e.g., a health care application of a mobile medical device) that is assigned in accordance with an attribute of an external electronic device. According to an embodiment, the application 1070 may include an application that is received from an external electronic device (e.g., the first electronic device 102, the second electronic device 104, or the server 106). According to an embodiment, the application 1070 may include a preloaded application or a third party application that is downloadable from a server. The names of components of the program module 1010 according to the embodiment may be modifiable depending on kinds of operating systems.

According to various embodiments, at least a portion of the program module 1010 may be implemented by software, firmware, hardware, or a combination of two or more thereof At least a portion of the program module 1010 may be implemented (e.g., executed), for example, by the processor (e.g., the processor 910). At least a portion of the program module 1010 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described Referring to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a display;
   a memory configured to store an application for editing an image; and
   a processor configured to output the image through the application onto the display,
   wherein the processor is configured to:
      in a first mode of the application, output, on the display, a first image, a first guide indicating an area to be cropped in the first image, and a preview which is an image in which the cropped area is corrected, and
      in response to a user input for changing a mode of the application from the first mode to a second mode, wherein the mode is a method of outputting the image, output, on the display, a second image which is changed from the first image, and a second guide which is changed from the first guide such that the preview which is the same image with the preview in the first mode is output, wherein the second guide indicates an area to be cropped in the second image,
   wherein curvature of the first guide and the second guide is determined based on a curvature of the first image and the second image.

2. The electronic device of claim 1, wherein the processor is configured to output the preview on the display in an area adjacent to the first guide and the second guide.

3. The electronic device of claim 1, wherein the processor is configured to output, on the display, a line for correcting a levelness of the image based on the curvature of the image.

4. The electronic device of claim 1, wherein the processor is configured to obtain a dominant color of an area output on the display in the first image, and to output, on the display, the first guide having a complementary color to the dominant color.

5. The electronic device of claim 1, wherein, in response to a user input for changing a size of the first guide, the processor is configured to change the preview in a corresponding manner to the changed size of the first guide.

6. The electronic device of claim 1, wherein, in response to a user input for changing a position of the first guide on the image, the processor is configured to change the preview in a corresponding manner to the changed position of the first guide.

7. The electronic device of claim 1, wherein, in response to a user input for changing an area output on the display in the image, the processor is configured to change the preview in a corresponding manner to the first guide present in the changed area.

8. The electronic device of claim 1, wherein the processor is configured to divide the first guide into a plurality of blocks and output the plurality of blocks on the display.

9. A method for outputting a guide in an electronic device, the method comprising:
   in a first mode of the application, outputting, on a display, a first image, a first guide indicating an area to be cropped in the first image, and a preview which is an image in which the cropped area is corrected;
   in response to a user input for changing a mode of the application from the first mode to a second mode, wherein the mode is a method of outputting the image outputting, a second image which is changed from the first image, and
   a second guide which is changed from the first guide such that the preview which is the same image with the preview in the first mode is output,
   wherein a curvature of the first guide and the second guide is determined based on a curvature of the first image and the second image.

10. The method of claim 9, wherein the outputting, on the display, of the image, the first guide indicating the area to be cropped in the image, and the preview corresponding to the first guide in the first mode of the application includes outputting the preview on the display in an area adjacent to the first guide.

11. The method of claim 9, further comprising:
    outputting, on the display, a line for correcting a levelness of the image based on the curvature of the image.

12. The method of claim 9, further comprising:
    obtaining a dominant color of an area output on the display in the first image, and outputting, on the display, the first guide having a complementary color to the dominant color.

13. The method of claim 9, further comprising:
    changing the preview, in response to a user input for changing a size of the first guide, in a corresponding manner to the changed size of the first guide.

* * * * *